Nov. 15, 1966 G. NIELSEN 3,286,083

INFORMATION STORAGE SYSTEM

Filed April 16, 1962 4 Sheets-Sheet 1

INVENTOR
GUNNAR NIELSEN

BY Paul D. Carmichael
ATTORNEY

Nov. 15, 1966 G. NIELSEN 3,286,083

INFORMATION STORAGE SYSTEM

Filed April 16, 1962 4 Sheets-Sheet 3

INFORMATION STORAGE SYSTEM

Filed April 16, 1962 4 Sheets-Sheet 4

United States Patent Office 3,286,083
Patented Nov. 15, 1966

3,286,083

INFORMATION STORAGE SYSTEM

Gunnar Nielsen, Johnson City, N.Y., assignor to International Business Machines Corporation, New York, N.Y., a corporation of New York Filed Apr. 16, 1962, Ser. No. 187,798
11 Claims. (Cl. 235—61.11)

The present invention relates generally to the data processing arts and more particularly to the provision of a system for storing and/or providing rapid access to a large quantity of information.

In data processing apparatus it is often necessary to have a memory unit for storing and providing access to a quantity of digital information. The memory may comprise a magnetic core matrix, magnetic drums, magnetic discs, magnetic tapes, cathode ray storage tubes, a semiconductor matrix or the like depending upon the intended application. For example, where an extremely large amount of information is to be stored and the time required to retrieve any particular portion of the information is not critical, magnetic tapes may be employed. Alternately, where high speed access is required, the memory may comprise a magnetic core matrix.

One type of storage system previously suggested in the art makes use of optical phenomena in that the information is stored in optical form on a record medium. For example, the information can be represented by the presence or absence of opaque areas on transparent photographic slides. The information is stored by exposing the photographic slides in accordance with the information and access is had thereto by sensing the recorded optical information.

A typical storage system of this type is disclosed in the Davis and Staehler U.S. patent, 2,830,285, issued April 8, 1958, wherein a portion of each word of digital information is recorded on one of a plurality of photographic slides. Each of the photographic slides is divided into a number of areas and each area is related to a portion of an information quantity. A cathode ray tube is employed for recording the information and obtaining access thereto. To read a stored word, the electron beam of the cathode ray tube is deflected in response to digital input information so that a spot appears at a predetermined location on the face of the tube. The position of the spot corresponds to the address of the selected word. The spot is relayed by parallel lens systems to simultaneously illuminate the first bit position of each portion of the selected word recorded on the plurality of photographic slides. The electron beam is then deflected and the spot moves in a predetermined pattern on the face of the cathode ray tube. The images of the spot scan and illuminate the areas on the photographic slides where the selected word is recorded. The information in the areas of the slides is sensed by photoelectron multipliers which transform the optical information into corresponding electrical output signals.

A number of special photographic slides representing the actual position of the spot provide feedback signals to the circuitry for deflecting the electron beam of the cathode ray tube. Two of these special slides are masks defined by alternate opaque and nonopaque bars while a third special slide has written in each area a binary word defining that address location. The horizontal and vertical feedback signals are passed through error integrators and like circuitry so that the position of the spot on the face of the cathode ray tube corresponds to the digital input information. In the Hoover U.S. patent, 2,855,539, issued October 7, 1958, the special photographic slides are a pair of binarily coded masks and a comparison is made between the digital input information and the digital feedback signals.

Although highly developed, such an information storage system is somewhat limited in the amount of information which can be recorded on one of the photographic slides. To avoid ambiguous and erroneous output signals, the area on the slide corresponding to a bit of information must be of such a size that the image of the spot does not illuminate more than one bit of information for any selected position of the spot on the cathode ray tube. The bit size and the overall capacity of the storage system is directly dependent upon the ability and accuracy with which the intensity and the size of the spot can be controlled. Complicated parallel relay lens systems and a plurality of photographic slides are required for storing a large quantity of information.

Briefly, the present invention relates to a system for recording input information in optical form on a record medium and/or providing quick access to and sensing the optical information recorded on the record medium. A word represented by optical information on a record medium is read by energizing one of a plurality of selectively operable and relatively stationary point light sources in response to input address information to provide a spot of light. This spot of light, or the image thereof, has a size corresponding to one bit position of the selected word. A scanning means is operative to effect relative movement between the projected image of the spot and the record medium at an extremely fast rate so that all bit positions of the selected word are illuminated. The optical information corresponding to the selected word is sensed in response to the illumination thereof and output signals corresponding to the selected word are provided.

Synchronizing means are provided for insuring that the bits of the previously recorded words are read in proper order and at a desired rate. In writing a selected word on the record medium, the operation is generally the same as described with the exception that the input information to be recorded is employed to modulate the selected point light source as relative movement is effected between the record medium and the projected image of the selected point light source.

It is the primary or ultimate object of the present invention to provide an informtaion storage system wherein an extremely large quantity of data is stored in a small area on a record medium and rapid acces is had to any of the stored information. The data is recorded as optical information at a very high density on a photographic slide or the like.

Another object of the invention is to provide an information storage system embodying a plurality of selectively operable point light sources wherein scanning means are used to effect relative movement between the record medium having information recorded thereon and the projected image of the light source. The selection of one of the light sources defines a word address and the scanning means causes interrogation of all bits in the word. As will be hereinafter more fully explained, the scanning means comprises an oscillating mirror assembly which sweeps an image of the light source across the record medium.

Yet another object of the invention is to provide an information storage system of the above type wherein means are included for synchronizing the operation of a sensing means disposed in transducing relation with the record medium and the scanning means. Synchronization is accomplished by providing an auxiliary light source whose image is moved across a synchronizing mask by the scanning means. The synchronizing mask modulates the light in such a manner that sensing means disposed in operative relation with respect thereto provide signals which gate the outputs from the sensing means associated with the record medium. Further, means are provided to insure that the data is read out in proper order regardless of the direction of movement of the reflected image of the selected point light source across the record medium.

Still another object of the invention is to provide a system of the type set forth in the above objects wherein the selectively operable point light sources are defined by a mask positioned adjacent the inside surface of a cathode ray tube. The mask is opaque and has a plurality of small apertures therein. Each aperture is of a size which corresponds to the size of an individual bit of the information. As will be hereinafter more fully apparent, the apertures are arranged in a staggered or staircase fashion so that maximum separation is maintained between the apertures but yet information is stored at an extremely high density on the record medium.

A further object of the invention is to provide an information storage system having the characteristics described above which is highly simplified in construction and operation.

The foregoing and other objects, features and advantages will be apparent from the following more particular description of a preferred embodiment of the invention, as illustrated in the accompanying drawings.

Figure 1:
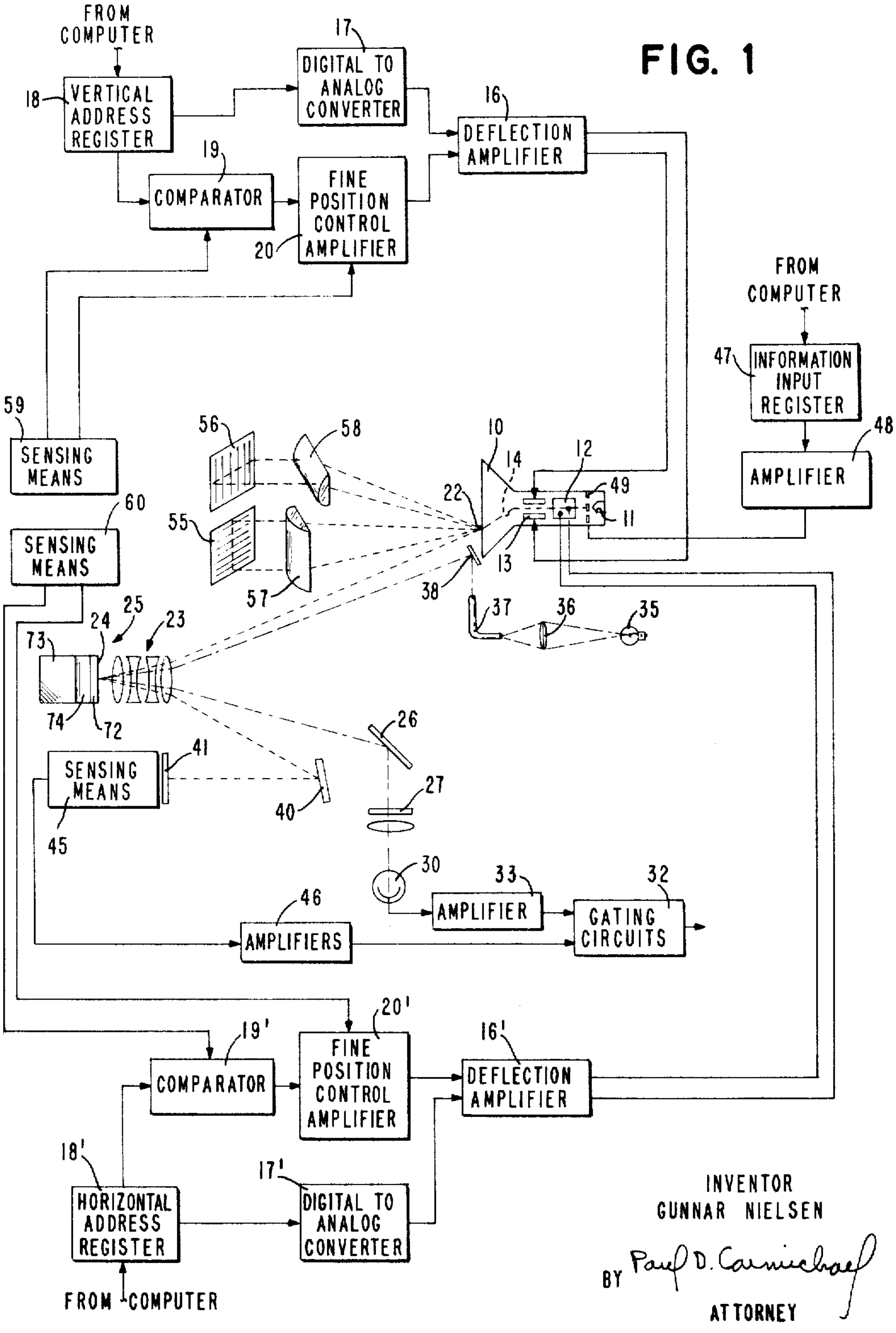
FIGURE 1 is a block diagram of an information storage system constructed and operated in accordance with the teachings of the present invention.

Referring now to the drawings and initially to FIGURE 1 thereof, there is shown an information storage system for recording input information in optical form on a record medium and/or providing rapid access to and sensing optical information recorded on the record medium. The storage system comprises a cathode ray tube 10 having an electron beam gun 11 and a pair of horizontal and vertical deflection means 12 and 13 defined by pairs of spaced plates. The electron beam gun 11 generates an electron beam 14 which is deflected by the electrostatic field produced between the deflection plates and excites a phosphor coating disposed at the forward end of the cathode ray tube. A point source of light or spot is produced on the face of the cathode ray tube and the positioning of this spot is regulated by the signals supplied to the deflection plates 12 and 13.

The vertical deflection plates 13 are connected to a deflection amplifier 16 which receives input signals from a digital-to-analog converter 17. The converter 17 is responsive to the signals supplied from a vertical address register 18. A computer, not shown, or other source of address signals supplies the vertical address register with coded digital signals in parallel form representing the desired vertical position of the spot of light on the face of the cathode ray tube. The coded digital signals entering the vertical address register 18 define one portion of the address of an information quantity or word to be recorded on or read from the record medium.

The vertical address register also supplies signals to a comparator 19 that receives vertical feedback signals and provides an error signal to a fine position control amplifier 20. The fine position control amplifier 20 drives the deflection amplifier 16 whereby a closed feedback loop is provided. This insures that the actual vertical position of the spot on the face of the cathode ray tube corresponds to the addressed or desired vertical position of the spot. The means for supplying the vertical feedback signals corresponding to the actual vertical position of the spot to the comparator 19 will be explained later in the specification.

The horizontal deflection plates 12 have similar circuitry associated therewith and, to avoid unnecessary repetition in the specification, primed reference numerals are employed in the drawings to designate like components. The horizontal address register 18' receives coded digital signals in parallel form from the computer. These signals define the remaining portion of the address of an information quantity or word to be recorded on or read from the record medium and the horizontal position of the spot on the face of the cathode ray tube. A closed feedback loop comprising the fine position control amplifier 20', comparator 19' and associated sensing means provides a means for insuring agreement between the actual and desired horizontal positions of the spot.

Figure 4:
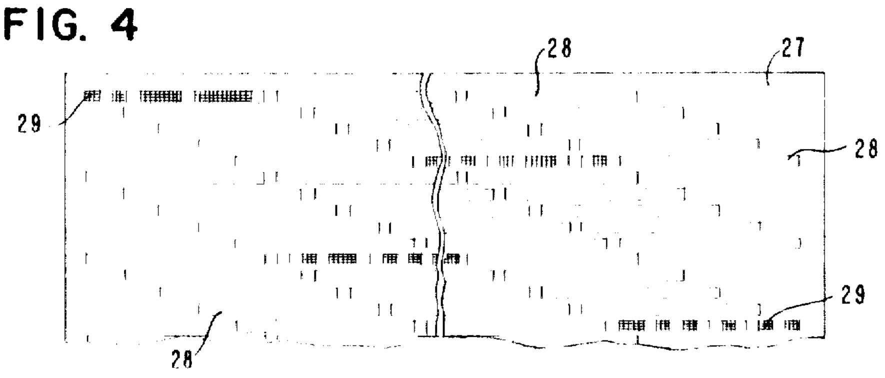
FIGURE 4 is an enlarged and fragmentary front view of the record medium.

As mentioned above, the electron beam 14 strikes the phosphor coating and a point source or spot 22 of light is produced on the face of the cathode ray tube. The image of the spot 22 is autocollimated by a lens system 23 and transmitted to the mirror surface 24 of an oscillating mirror assembly 25. The reflected image of the spot 22 is projected onto a transparent and slide-like record medium 27 by way of a mirror 26. As shown in FIGURE 4 of the drawings, the recorded medium 27 has a plurality of generally rectangular word or storage locations 28 thereon. Each of the word locations is further divided into a number of bit storage positions 29 that are aligned in adjacent side-by-side relation. Each of the storage positions 29 corresponds to one bit of digital information which is represented by the presence or absence of an opaque spot in this area. An illumination responsive device or photomultiplier tube 30 is positioned behind the record medium 27 and defines a means for sensing the information recorded thereon. The vertical and horizontal address portions of the address of a word to be retrieved from storage are placed in the address registers 18 and 18' and the spot 22 on the face of the cathode ray tube is positioned in accordance with this address information. The image of the spot on the record medium is the size of one bit storage position and is swept across the corresponding storage location 28 by the oscillating mirror assembly 25. The light passes through the bit storage positions which are transparent and energizes the photomultiplier tube 30 to produce a train of electrical signals corresponding to the stored word. This train of pulses is passed to gating circuits 32 via amplifier 33.

A means is provided for synchronizing the operation of the reading or sensing means defined by photomultiplier tube 30 with the oscillating mirror assembly 25. This is accomplished by the use of an auxiliary point light source comprising lamp 35, condenser lens 36 and optical fiber 37. A mask may be positioned at the end of optical fiber 37, if desired, but a point source of light the same size as the spot 22 is produced. The point source of light is reflected by mirror 38 and is transferred via lens system 23 to the mirror surface 24 of the oscillating mirror assembly 25. The light is returned through lens system 23 to mirror 40 and the reflected image of the auxiliary point source of light is focused on a synchronizing mask 41. The mask 41, as will be hereinafter explained, is generally transparent with opaque markings thereon. Disposed behind the synchronizing mask is an illumination responsive sensing means 45 whose output signals are applied to gating circuits 32 via amplifiers 46. The arrangement is such that the reflected image of the auxiliary point source of light is swept across the synchronizing mask 41 in synchronism with the deflection of the reflected image of spot 22 across the record medium 27.

In recording or storing information, the record medium 27 is replaced with a photographic slide having an unexposed light sensitive emulsion thereon. The information to be recorded is loaded into an information input register 47 from the computer or other source of coded digital input signals. The information is transferred in serial or bit-by-bit fashion to an amplifier 48 which is connected to the grid 49 of the cathode ray tube 10. The information input register 47 may comprise a series of bistable devices, such as triggers which are loaded with input information in parallel and which are connected in cascaded relation to provide a serial output. An arrangement of such a register is shown in FIGURE 13 of the copending application of Robert J. Urquhart, entitled, "Method and Apparatus for Processing Data," Serial No. 79,869, filed December 30, 1960 and now Patent No. 3,197,621, which is assigned to the assignee of the present application. The point source of light on the face of the cathode ray tube is modulated or turned on or off in accordance with the information in register 47 as the image of the same is swept across the selected storage area of the photographic slide. The selected storage area is controlled by the coded digital signals in the vertical and horizontal address registers. After all of the words to be recorded have been written on the photographic slide, the photographic emulsion is developed to provide the record medium 27.

Figure 2:
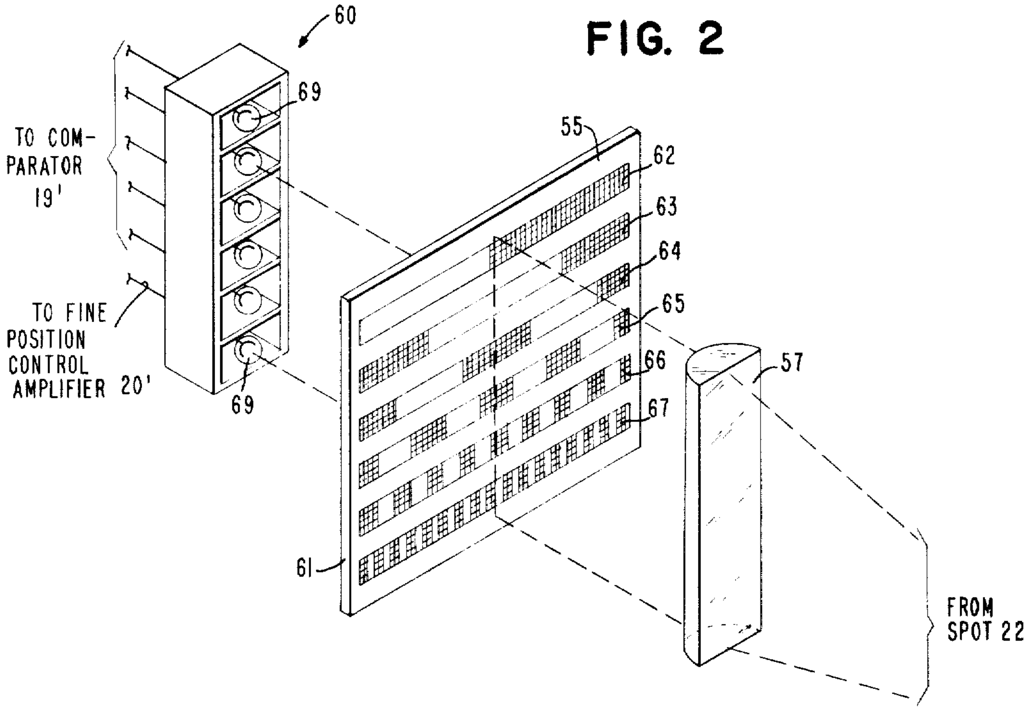
FIGURE 2 is a perspective view of the means employed in the system of FIGURE 1 for providing horizontal feedback signals.

Considering now the means employed for providing feedback signals to the comparators 19 and 19' and the fine position control amplifiers 20 and 20', a pair of horizontal and vertical feedback masks 55 and 56 are illuminated with normally related straight line images of the spot 22 on the face of the cathode ray tube. A lens system 57 associated with and positioned in front of the horizontal feedback mask 55 produces a vertical line image on this mask from the point source of light or spot 22 while the lens system 58 produces a horizontal line on vertical feedback mask 56. Sensing means, designated generally by the reference numerals 59 and 60, are disposed behind the horizontal and vertical feedback masks and provide signals to the comparators and the fine position control amplifiers. As shown in FIGURE 2 of the drawings, the horizontal feedback mask 55 comprises a transparent plate 61 which is divided into a plurality of horizontal areas 62–67. The areas 62–66 have certain portions thereof coated with opaque material in accordance with a suitable binary code. In the illustrated embodiment, a reflected binary or Gray code is employed whereby adjacent coded combinations differ by only one digit with respect to each other. The opaque coatings on the five areas of the plate define thirty-two discrete horizontal address locations.

The sensing means 60 comprises a series of vertically aligned photomultiplier tubes 69 which are positioned behind the horizontal feedback mask 55 in transducing relation with respect to the light passing therethrough. One of the photomultiplier tubes 69 is associated with each of the areas 62–66 on the feedback mask so that parallel electrical signals representing a digital number corresponding to the position of the illuminated vertical line on the face of the mask is obtained and transferred to the comparator 19'. As previously mentioned, the position of the illuminated vertical line on horizontal feedback mask 55 represents the actual horizontal position of the spot of light 22 on the face of the cathode ray tube. The comparator 19' receives the horizontal address input signals from the address register 18' and the coded digital signals from the sensing means 60. This comparator, as well as the comparator 19, may be of the type shown and disclosed in either of the Ketchledge patents, 3,011,150 and 3,011,151, issued November 28, 1961, depending upon the particular code used in representing the input signals and the coding employed on the feedback mask. Further, the input registers and other circuitry may be of the type disclosed in the Hoover and Ketchledge patent, 2,855,540, issued October 7, 1958.

The area 67 is defined by alternate opaque and transparent portions each of which are approximately one-half the size of the coresponding portions on area 66. One of the photomultiplier tubes 69 is disposed behind the area 67 and provides a signal to the fine position control amplifier 20'. The arrangement is such that for a particular address location, the projected vertical image of the spot on the face of the cathode ray tube is disposed on a line between opaque and transparent portions on area 67.

The above discussion has been generally limited to the means for providing horizontal feedback signals indicating the actual horizontal position of the spot on the face of the cathode ray tube to the comparator 19'. Similar apparatus is employed for providing vertical feedback signals, although the areas on the vertical feedback mask extend vertically and the lens system projects a horizontal line image of the spot on the cathode ray tube. It should be understood that the type of binary coding used on the feedback masks is a matter of choice. To obtain the required resolution or number of possible feedback signals, a plurality of masks can be used for each feedback channel. In this case, each feedback channel would comprise a number of parallel optical paths. Alternately, the face of the cathode ray tube and the record medium may be divided into various relatively large areas and a single feedback mask could be used in connection with all these areas. The cathode ray tube and its associated circuitry would be relied upon to deflect the spot of light to the appropriate large area. Means would be included for avoiding any ambiguity in the feedback signals when the spot was positioned adjacent or on a borderline between adjacent areas.

Figure 3:
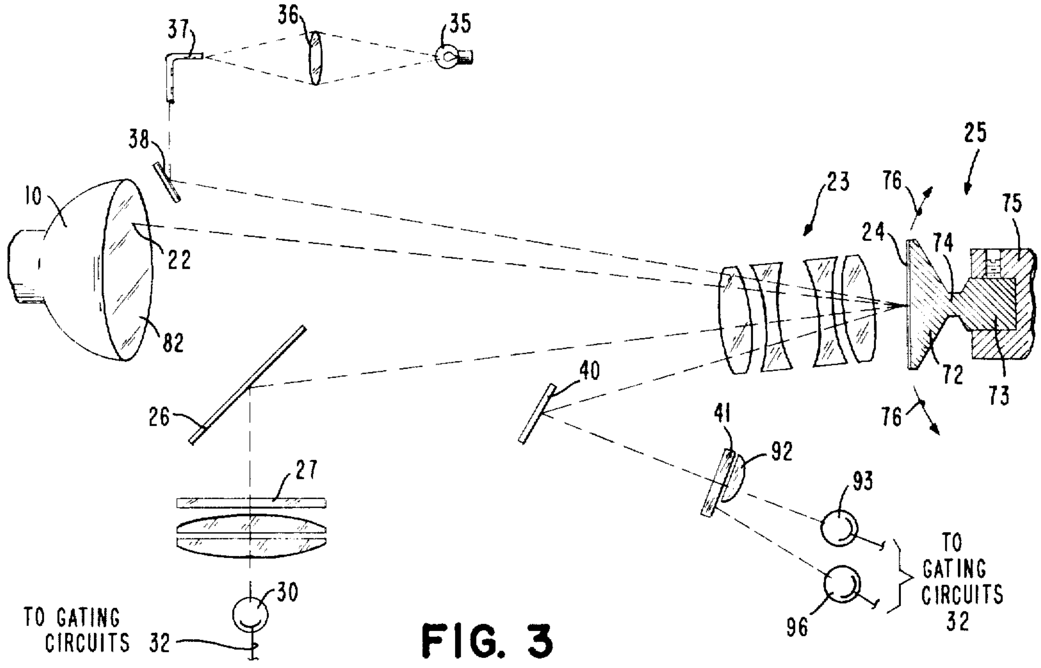
FIGURE 3 is an enlarged view of a portion of the optical apparatus employed in the system of FIGURE 1.

The oscillating mirror assembly is illustrated in FIGURE 3 of the drawings and has a generally triangularly shaped head 72 whose forward surface is plated and polished to define the miror 24. The head 72 is joined to a rectangularly shaped body 73 by a thin short neck 74. The body 73 is mounted in a chuck 75 of an ultrasonic transducer or other means for imparting vibratory motion thereto. The body is moved vertically at a rapid rate and the triangularly shaped head 72 moves up and down as represented by the arrows 76. The reflections of the spot 22 on the face of the cathode ray tube and the auxiliary light source are deflected at a continuously changing angle. The resonant frequency of the oscillating mirror assembly is preferably matched with the desired frequency of operation so that the mirror surface 24 experiences maximum deflection at the selected frequency.

Figure 9:
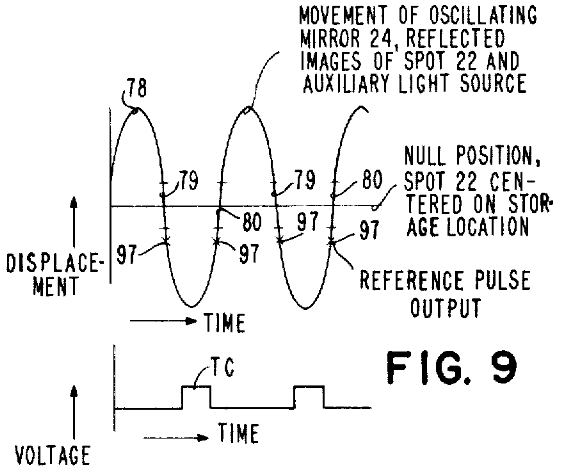
FIGURE 9 is a graphical illustration of the displacement of the mirror surface of the oscillating mirror assembly with respect to time and a timing signal used in the system of FIGURE 1.

The mirror surface 24 moves in a sinusoidal manner with respect to time as is shown by the line 78 in FIGURE 9 of the drawings. It is preferred that the information be recorded on or read from the record medium 27 only during the times that the movement of the mirror surface is linear—i.e., about the null position as indicated by portions 79 and 80 of the line 78. When the mirror surface 24 is moving along portions 79 of its sinusoidal path of travel, it is traveling in one direction. However, it is traveling in the opposite direction when moving along portions 80 of the curve. The curve 78 also represents the movement of the reflected images of spot 22 and the auxiliary point source of light across the record medium 27 and the synchronizing mask 41. The reflected image of the spot 22 is swept back and forth across the record medium and illuminates the selected storage location 28 only during the portions 79 and/or 80 of the curve 78. As will be later explained, it is possible to record or sense information on the record medium 27 when the mirror surface 24 is moving in either direction (portion 79 or portion 80) by the use of various buffering circuits. Alternately, the information may be recorded or sensed only when the reflected image of the spot is moving in one direction. In any event, the arrangement is such that the information is recorded or read in proper bit-by-bit or serial sequence. While a particular embodiment of the oscillating mirror assembly has been shown and disclosed, other types may be employed. For example, a mirror may be vibrated about its axis by electromagnetic drive means to provide the desired oscillatory motion.

The lens system 23 is defined by symmetrical pairs of lenses. The image of the spot 22 on the face of the cathode ray tube is autocollimated by the lens system. The reflections from the mirror surface 24 of the oscillating mirror assembly 25 are returned through the lens system 23 and the reflected image of spot 22 is focused on the record medium 27 by mirror 26. As the mirror surface 24 is oscillated, the reflected image of the spot 22 is swept across and illuminates in serial fashion the aligned bit positions in the addressed storage location 28. The information in each bit position 29 within the addressed storage location is indicated by the presence or absence of opaque material thereon. When the reflected image of the spot illuminates a bit position which is opaque, the photomultiplier tube 30 remains in its nonconductive state which corresponds to one binary state. However, when a bit position having no opaque material thereon is illuminated, light is transmitted through the record medium and energizes the photomultiplier tube 30 to produce an output signal representative of the other binary state. The lens system 23 and the mirrors 24 and 26 do not provide any magnification or demagnification so that the record medium 27 is the same size as the face of the tube. Considered from another point of view, the mirror image of the face of the cathode ray tube is projected onto and moved across the record medium. If desired, the relay lens system can be designed to magnify or reduce the reflected image of the spot 22.

Figures 5, 6:
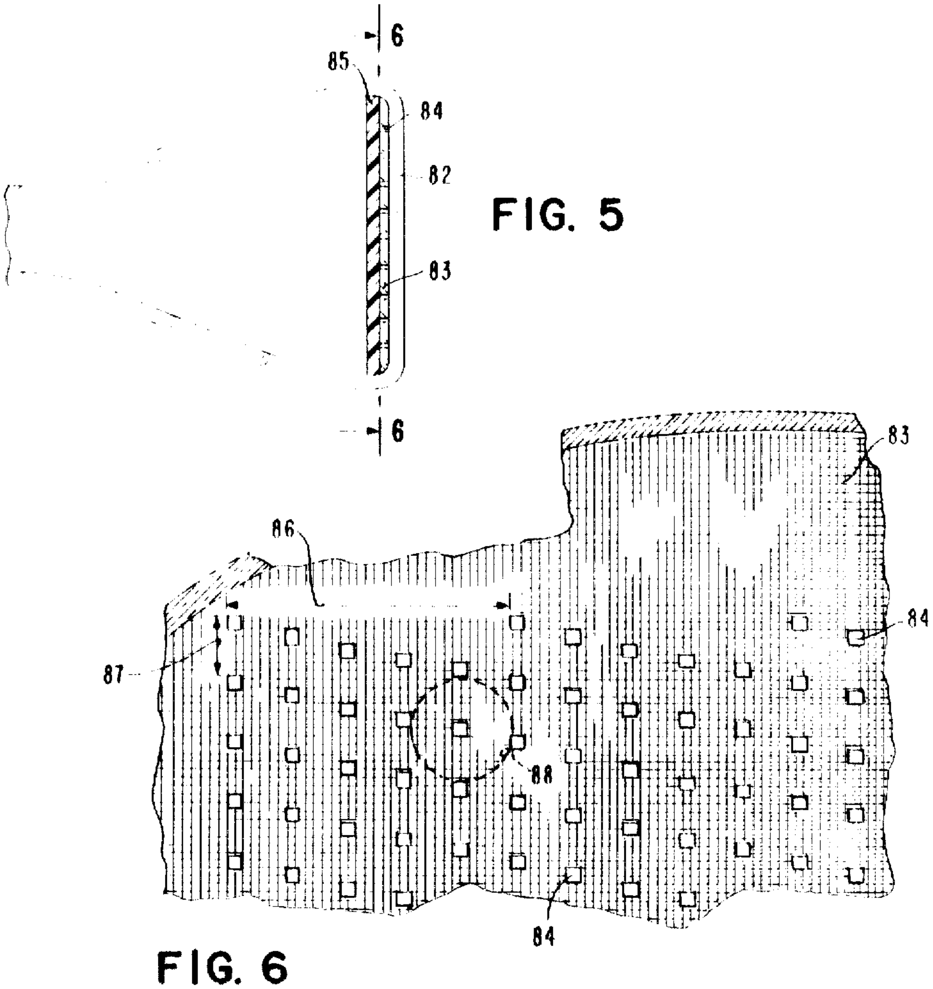
FIGURE 5 is a fragmentary side sectional view of the forward end portion of the cathode ray tube used in the system of FIGURE 1.
FIGURE 6 is an enlarged end sectional view showing particularly the mask employed with the cathode ray tube and taken generally along the section line 6—6 of FIGURE 5.

The cathode ray tube comprises an evacuated envelope having a transparent forward face 82 as is illustrated in FIGURES 5 and 6 of the drawings. Disposed in overlying relation on the inner surface of the face 82 is an opaque mask 83 having a plurality of apertures 84 therein. The mask 82 can be provided by etching and/or coating the inner surface of the face of the tube or by placing a thin member against the inner surface. Disposed in back of the mask 83 is a phosphor coating 85 which is energized or excited by the electron beam 14 and produces visible light in response thereto.

Each of the apertures 84 defines the possible location of the spot 22 on the face of the cathode ray tube. Further, since the optical relaying means does not provide any magnification or demagnification, each aperture is of a size equal to a single bit position 29 on the record medium. One of the apertures 84 is provided for each and every storage location 28 on the record medium. The apertures 84 are arranged in a staggered or staircase array so that maximum separation is maintained between adjacent apertures but yet maximum use is made of the available record medium. The horizontal distance 86 between any two adjacent apertures 84 on the same horizontal line is equal to or slightly greater than the corresponding length of one of the storage locations 28 on the record medium 27. The vertical spacing 87 between adjacent apertures 84 in the same vertical row is greater than the total vertical distance equal to five horizontal rows on the record medium. The horizontal rows of the apertures 84 are offset laterally with respect to each other whereby an opaque area (represented by circle 88) of considerable size is provided about each of the apertures in the mask.

The above described arrangements are particularly important in accomplishing the objects of the invention. The use of the mask, in combination with the staggering or offsetting of the apertures 84 to provide a large opaque area about each of the apertures, allows considerable freedom in the control of the size and positioning of the electron beam and the energized portion of the phosphor coating. The electron beam can "bloom"—a relative large area of the phosphor is excited—without affecting the operation of the storage system as long as at least a portion of the excited phosphor coating overlies the selected aperture. A high brightness and burn resistant phosphor is employed. Further, since the energized area of the phosphor coating can be much larger than the actual size of the spot appearing on the face of the cathode ray tube, the control of drift or movement of the electron beam during a reading or writing operation is not as critical as would be the case if such a mask were not used.

The energized area of the phosphor has a Gaussian distribution of light output across its diameter so that the edges of this area produce much less light than the center of the spot. When the energized area is centered over one of the apertures 84 in the mask, only the light emitted from the small center portion of the area passes through the aperture. The resultant spot on the face of the cathode ray tube is quite bright and the intensity of this spot does not vary appreciably from the center to the outer edges thereof. As shown in FIGURE 4 of the drawings, very efficient use is made of the available area on the record medium. If desired, the brightness or intensity of the spot on the face of the cathode ray tube can be monitored by a separate optical relay path and intensity responsive means providing feedback signals to the intensity control of the cathode ray tube.

The mask 82 is positioned in sandwiched relation between the inner surface of the face of the cathode ray tube and the phosphor coating. This arrangement eliminates all parallax problems of the type usually encountered when a mask is positioned over the outside of the face of a cathode ray tube. Further, the mask is contained within the envelope of the cathode ray tube and is not subject to damage due to misuse, etc.

Figure 7:
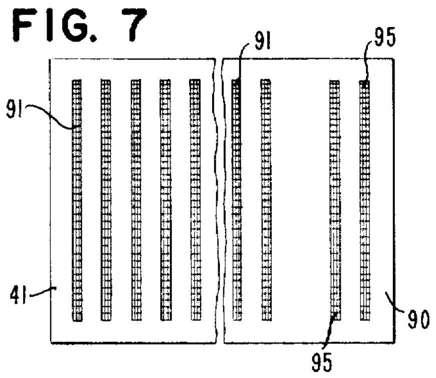
FIGURE 7 is a front elevation view of the synchonizing mask.

The synchronizing mask 41 comprises a transparent plate 90 having a plurality of vertically extending opaque lines 91 thereon as is shown in FIGURE 7 of the drawings. The total number of lines 91 on the synchronizing mask is equal to one more than the number of bit positions 29 in one storage location 28 on the record medium 27. The sensing means 45 comprises a condenser lens 92 and a photomultiplier tube 93 (see FIGURE 3) so that a series of equally spaced pulses are supplied to the gating circuits 32 when the reflected image of the auxiliary point light source is swept across the synchronizing mask 41 by the movement of the oscillating mirror assembly 25.

The synchronizing mask 41 also has a pair of vertically extending and spaced opaque lines 95 which are disposed to one side of the lines 91 and are monitored by a photomultiplier tube 96 of the sensing means 45. The photomultiplier tube 96 provides a reference pulse output to the gating circuits 32 each time the image of the auxiliary point light source is deflected across the synchronizing mask 41. When the image is moving across the synchronizing mask from left to right as observed when looking at FIGURE 7 of the drawings, the reference pulse occurs after the train of pulses from photomultiplier tube 93. However, the reference pulse is transferred to the gating circuits 32 prior to the pulse train from photomultiplier tube 93 when the reflected image of the auxiliary point light source is deflected across the synchronizing mask in the opposite direction. The pulse trains from the photomultiplier tube 93 occur during the time intervals defined by portions 79 and 80 of the curve 78 shown in FIGURE 9 of the drawings while the reference pulses are evidenced at the times represented by points 97 on this curve.

Figure 8:
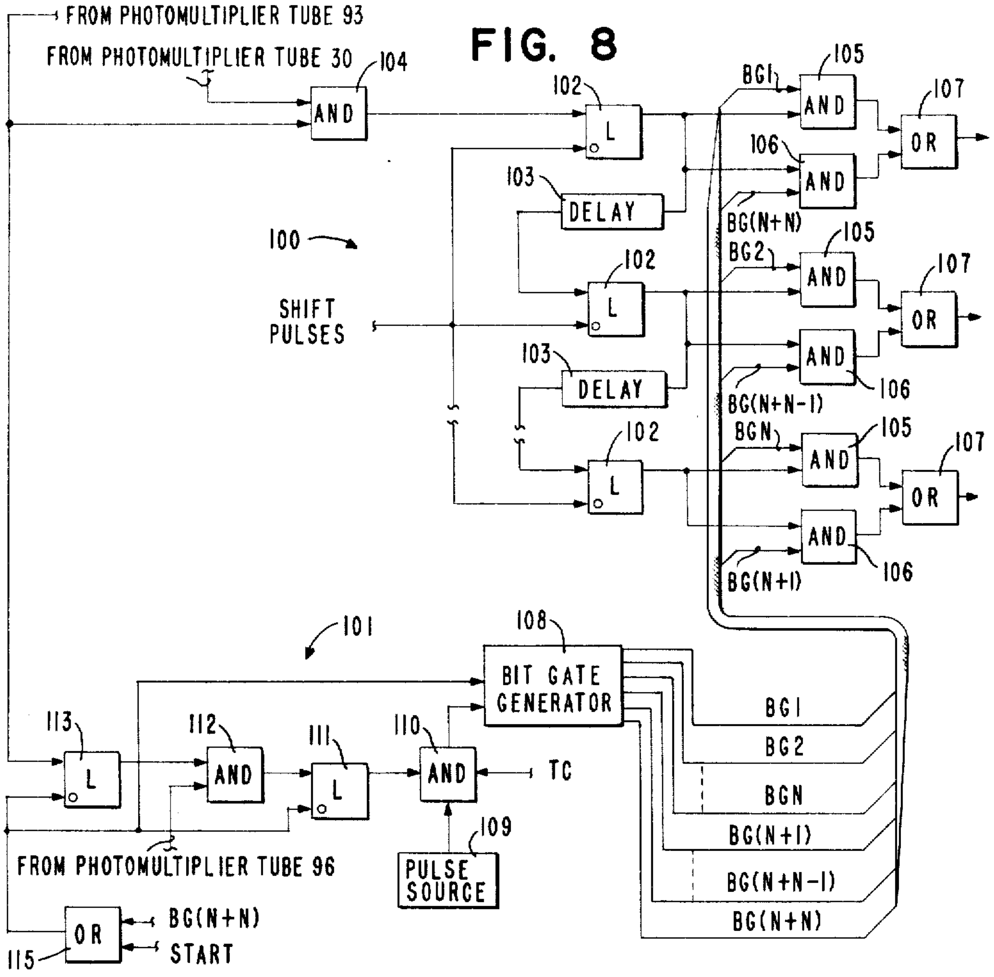
FIGURE 8 is a schematic circuit diagram showing the gating circuits used in the system of FIGURE 1.

As shown in FIGURE 8 of the drawings, the gating circuits 32 comprise generally a register and buffer 100 and timing means 101. In a reading operation where a word is read each time the image of the spot 22 on the face of the cathode ray tube is deflected across the record medium, it is necessary to rearrange the information sensed by the photomultiplier tube 30 on alternate scans of the reflected image of the spot. For purposes of illustration it may be assumed that when the reflected image of the spot is deflected across the record medium 27 in a direction corresponding to the portions 79 of curve 78, the sensed data word is presented to the gating circuits 32 in serial fashion with the bit having the lowest significant weighting appearing first. This sequence of data delivery may be compatible with the manner in which the computer of any other device utilizing the output of the information storage system is organized. When the reflected image of the spot 22 is moved across the record medium in the opposite direction, as represented by the portions 80 of curve 78, the least significant bit will appear last in the pulse train supplied to the gating circuits 32. The sequence of the data sensed during alternate read times is changed so that the same can be used by the computer or other device.

The register and buffer 100 of the gating circuits 32 comprises a plurality of stages. Each of the stages has a bistable storage device or latch 102 and is associated with one of the bit positions in a storage location on the record medium. The latches 102 are connected in cascaded relation in that the set output of each latch (with the exception of the latch in the last stage) is connected to a delay device 103 and defines the set input to the latch of the next stage. The set input to latch 102 of the first stage is the output of And block 104 which combines the train of synchronizing pulses supplied by photomultiplier tube 93 with the information input signals coming from photomultiplier tube 30. The set input to the latch of the first stage is a train of accurately gated data signals corresponding to the information recorded in the selected storage location on the storage medium 27. The reset input to all of the latches 102 is supplied by a source of shift pulses, not shown, which produces a continuous train of pulses during a read operation. The shift pulses occur at times nominally midway between the data signals coming from And block 104.

The first bit of the sensed information is initially stored in the latch 102 of the first stage of the register and buffer. The shift pulse then resets the first stage and a short time later, depending on the delay provided by device 103, the first digit will be stored in the second stage. By this process of registering and shifting, the information signal is stored in the order received in the latches 102. Of course, the shift pulses cease as soon as the register has been filled so that the read information is retained therein. While only the first, second and last stages of the register and buffer 100 have been shown, it should be understood that the remaining intermediate stages are generally similar to the second stage.

The set output of each of the latches 102 serves as the input signals to a pair of And blocks 105 and 106. The remaining input to each of the And blocks 105 and 106 is a timing pulse designated by the letters BG followed by a symbol indicating the order of occurrence of the particular timing pulse. For example, the timing signal BG1 supplied to And block 105 of the first stage occurs first, the timing signal BG2 associated with the And block 105 of the second stage occurs second, and the timing signal BGN supplied to And block 105 of the last stage occurs at the end of a readout operation. The timing signals BG1–BGN are employed during alternate readout operations when the sensed data is to be read out in the same order or sequential arrangement as when presented to the gating circuits. During the other readout times, the timing signals BG(N+1) through BG(N+N) associated with And blocks 106 are employed so that the first information bit or signal received from photomultiplier tube 30 is presented at the end of a readout operation. The outputs of the And blocks 105 and 106 for each stage of the buffer and register are combined in an Or block 107. The signals from the Or blocks 107 define the output of the information storage system and are transferred to the computer or other device for further processing.

The timing signals BG1–BGN and BG(N+1)–BG(N+N) are provided by a bit gate generator 108 which is preferably of the type shown and disclosed in the G. J. Cour patent, 3,017,627, issued January 16, 1962, which is assigned to the assignee of the present invention. This patent also discloses the structure and operation of a typical latch circuit for those desiring more information concerning the same. In essence, the bit gate generator is a binary counter having a capacity and providing a number of timing signals or bit gate pulses equal to twice the number of bit positions in one of the storage locations on the record medium.

The bit gate generator 108 is incremented by pulses supplied from free running pulse source 109 via And block 110. The And block 110 combines the output of the pulse source 109 with a timing signal TC and a synchronizing signal provided by the set output of a latch 111. The timing signal TC is shown in FIGURE 9 of the drawings and is at the positive or binary one level for a period of time between successive reading operations as represented by portions 79 and 80 of the curve 78. The signal TC is at the binary one level only when the reflected image of the spot 22 is not scanning a selected storage location on the record medium. During each time interval that the timing signal TC is at the positive or binary one level, the pulse source 109 produces a number of pulses equal to the number of stages in the register and buffer 100 and to the bit positions in one of the storage locations on the record medium. The bit gates BG1–BGN are produced when the TC signal is at the positive level the first time and the bit gates BG(N+1)–BG(N+N) are produced when the timing signal TC again goes to the positive level. The arrangement is such that the words sensed by photomultiplier tube 30 are introduced into buffer and register 100 and are thereafter read out in proper sequence.

It is necessary to synchronize the operation of the bit gate generator 108 with the direction of movement of the reflected image of the spot 22 across the record medium. This is accomplished by the circuitry including latch 111 whose set input is connected to the output of And block 112. The And block 112 combines signals from a latch 113 and the reference pulse supplied by photomultiplier tube 96. The latch 113 is responsive to the pulse train of synchronizing signals coming from the photomultiplier tube 93. And block 112 will not be energized unless the pulse train provided by photomultiplier tube 93 occurs prior to the reference pulse from photomultiplier tube 96. The bit gate generator 108 will not begin counting to provide the timing signals BG1–BGN until the spot has been deflected across the record medium in the direction represented by the portion 79 of the curve 78. This synchronizing means insures that the information in the buffer and register 100 is read out in a proper sequence with respect to the movement of the oscillating mirror assembly 25. The latches 111 and 113 are reset when the information storage system is initially turned on and after each cycle of operation of the bit gate generator 108. This is accomplished by combining a start signal and the bit gate *BG(N+N)* in an Or block 115. The output of Or block 115 is connected with the reset inputs of latches 111 and 113 and the bit gate generator 108.

The timing signal TC may also be used to gate the coded digital signals supplied to the vertical and horizontal address registers 18 and 18'. The spot 22 on the face of the cathode ray tube is positioned to define the selected address location only during those time intervals when the reflected image of the spot is not being deflected across the record medium. While the above described apparatus permits information to be sensed and read out when the reflected image of the spot is moving in either of two directions, it is possible to sense and read the information only on alternate scans of the record medium by the reflected image of the spot. In this type of operation it would not be necessary to rearrange portions of the read information although the access speed of the storage system would be substantially reduced. The rate at which the information can be gated in proper sequence from the buffer and register 100 is controlled by the rate of pulse source 109 and is relatively independent of the rate at which the information is sensed. This is particularly advantageous since the computer or other device utilizing the output signal can operate relatively independently of the information storage system.

Considering now the operation of the above-described information storage system, it will be assumed that the record medium 27 has information recorded thereon and it is desired to read out a word in a selected storage location. The coded digital input signals from the computer or other suitable source are transferred to the vertical and horizontal address register 18 and 18'. Signals are applied to the deflection plates 12 and 13, the electron beam causes a portion of the phosphor coating 85 to glow and a spot of light 22 appears on the face of the cathode ray tube. The size of the spot 22 is accurately regulated by one of the apertures 84 in the mask 83 and the position of the spot corresponds to the digital input signals. Feedback signals indicating the actual position of the spot on the face of the cathode ray tube are returned to the comparators 19 and 19' and fine position control amplifiers 20 and 20' via horizontal and vertical feedback channels comprising the feedback masks 55 and 56. The feedback signals insure that the actual position of the spot 22 on the face of the cathode ray tube corresponds with the desired position of this spot as represented by the digital input signals in the address registers 18 and 18'. The selection and/or positioning of the spot on the face of the cathode ray tube is accomplished during the time intervals represented by the portions of the curve 78 between the portions 79 and 80 thereof.

After the selected spot has been energized, the reflected image thereof is swept across the corresponding storage location on the record medium 27. Simultaneously, the reflected image of the auxiliary point light source is moved across the synchronizing mask 41. The digital optical information recorded in the selected storage location is sensed by the photomultiplier tube 30 and loaded in serial fashion in the register and buffer 100. As previously explained, the sensed information in the register and buffer 100 is read out under the control of the bit gate generator 108. This readout operation takes place during the time interval represented by the portions of the curve 78 disposed between the portions 79 and 80 of this curve. At the same time, other digital input signals are being supplied to the vertical and horizontal address registers 18 and 18' in preparation for the next cycle of operation.

The information storage system provides very rapid access to an extremely large quantity of data recorded on the record medium. For example, it is contemplated that one million bits of information can be stored on one of the photographic slides 27 and when each storage location comprises approximately seventy bits of information an access time in the order of fifteen to twenty microseconds per word can be obtained. At this rate of operation, the oscillating mirror assembly would vibrate in the range of thirty to forty kilocycles per second. To increase the storage capacity of the system, a transport can be employed for very quickly changing the record medium in response to signals supplied by the computer.

In recording information, a transparent slide having a radiation responsive coating thereon replaces the record medium 27. The digital information to be recorded is introduced and temporarily stored in the information input register 47 while its associated digital address signals are placed in the address registers 18 and 18'. While the reflected image of the face of the cathode ray tube is scanned across the slide, the selected spot 22 on the face of the cathode ray tube is modulated or turned on and off in response to the serial information coming from information input register 47. The radiation responsive coating on the selected storage area of the slide is exposed in accordance with the digital information.

The recording of information may take place at a somewhat slower rate than the reading of information previously recorded. The limitation on the recording speed is the inherent decay or response time of the phosphor coating 85. The writing operation may be accomplished on each and every scan (portions 79 and 80 of curve 78) providing gating circuits similar to gating circuits 32 are associated with the information input register 47. Alternately, the writing may be performed only when the reflected image of the modulated spot 22 is moving across the photographic slide in one direction. In many applications, the time required for writing or storing information can be longer than the time required in reading or obtaining access to any particular word of stored information. After the radiation responsive coating on the slide has been exposed in accordance with the information, the same is developed to provide the record medium.

It should now be apparent that the objects initially set forth have been accomplished. The information storage system allows an extremely large quantity of information to be recorded on a relatively small record medium and access may be had to any portion of the recorded information in a minimum of time. The mask on the inner face of the cathode ray tube provides a very accurately positioned and defined spot of light whose reflected image is deflected across the selected storage location of the record medium by the oscillating mirror assembly.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An information storage system comprising:

a record medium having a plurality of data storage locations thereon;

each of said data storage locations having a plurality of bit positions;

a bit of digital information recorded in optical form in each of said bit positions;

a cathode ray tube having a luminescent surface and electron beam producing means for producing a point source of light of said luminescent surface;

optical means for transmitting an image of said point source of light to said record medium;

said image of said point source of light having a size closely approximating that of one of said bit positions;

a source of input address signals representing a selected one of said storage locations on said record medium;

means to position said point source of light in response to said input address signals;

illumination responsive means disposed in transducing relation with respect to said record medium; and said optical means comprising means to sweep said image across said selected one of said storage locations to sequentially illuminate the bit positions thereof.

2. A digital information storage system comprising:
a record medium having a plurality of data storage locations thereon;
each of said data storage locations having a plurality of bit positions;
a cathode ray tube having a radiation emitting surface and electron beam producing means for providing a point source of radiation at said radiation emitting surface;
means for transmitting an image of said point source of radiation to said record medium;
said image of said point source of radiation having a size at said record medium approximating that of one of said bit positions;
a source of input address signals representing a selected one of said storage locations on said record medium;
means to position said point source of radiation in response to said input address signals such that the image thereof is transmitted to that part of the record medium containing the selected one of said storage locations; and
said means to transmit comprising means to move said image across said selected one of said storage locations to radiate the bit positions thereof.

3. Apparatus according to claim 2 further characterized by:
radiation responsive sensing means disposed in transducing relation with respect to said record medium;
said sensing means providing output signals corresponding to digital information recorded in said selected one of said storage locations;
synchronizing means providing signals for gating said output signals from said sensing means;
said synchronizing means comprising an auxiliary point source of radiation;
a synchronizing mask having information recorded thereon;
a second radiation responsive sensing means disposed in transducing relation with respect to said synchronizing mask;
said means to move causing an image of said auxiliary point source of radiation to move across said synchronizing mask to produce gating signals; and
means for gating said output signals in response to said gating signals.

4. Apparatus according to claim 2 further characterized by:
said cathode ray tube having an opaque mask positioned adjacent said radiation emitting surface;
said mask having an aperture therein for each of said storage locations; and
each of the apertures having a size approximating that of one of said bit positions on said record medium.

5. Apparatus according to claim 4 further characterized by:
said storage locations on said record medium and said apertures in said mask being arranged in a staggered fashion to provide an opaque area about each of said apertures in said mask of an area significantly greater than that of said aperture.

6. An information storage system comprising:
a record medium having a plurality of data storage locations thereon;
each of said data storage locations having a plurality of bit positions;
a luminescent surface;
means to energize selected areas of said luminescent surface;
an opaque mask positioned adjacent said luminescent surface;
said mask having apertures therein;
each of said apertures corresponding to one of said storage locations and having a size corresponding to one of the bit positions in the associated storage location;
each of said apertures providing an accurately defined spot of light when the area of the luminescent surface adjacent the same is energized; and
means to effect relative movement between said record medium and said luminescent surface to cause a spot of light to illuminate each bit position in its associated storage location.

7. Apparatus according to claim 6 further characterized by:
the spacing between adjacent apertures in said mask in a first direction being approximately equal to the spacing between adjacent storage locations on said record medium in the direction corresponding to said first direction; and
the spacing between adjacent apertures in said mask in a second direction normal to said first direction being greater than the spacing between adjacent storage locations on said record medium in the direction corresponding to said second direction.

8. An information storage system comprising:
a record medium having a plurality of data storage locations thereon;
each of said data storage locations having a plurality of bit positions;
an array of spaced and selectively operable radiation sources;
means to project an image of said array of radiation sources on said record medium;
each of said radiation sources corresponding to one of said data storage locations and being adapted to radiate at least one of the bit positions thereof;
means to selectively energize said radiation sources; and
means to effect oscillatory movement between said record medium and said image of said array so that said image moves relatively across said record medium in a first direction and then in the opposite direction.

9. Apparatus according to claim 8 further characterized by:
sensing means disposed in transducing relation with respect to said record medium;
said sensing means providing output signals corresponding to the information recorded in said storage locations; and
means to rearrange the order of the output signals on alternate relative movements between said image and said record medium.

10. Apparatus according to claim 9 further characterized by:
said means to rearrange comprising a register for receiving said output signals;
means to gate said signals from said register in a selected sequence;
said means to gate comprising an auxiliary source of radiation and a synchronizing mask having information thereon;
said means to effect relative movement causing an image of said auxiliary source to move relatively across said synchronizing mask in synchronism with said relative movement of said image of said array across said record medium; and
radiation sensing means disposed in transducing relation with respect to said synchronizing mask and providing signals controlling said means to gate.

11. A binary digital information storage system, comprising:
a record medium having a plurality of data storage locations, each location including a plurality of bit positions, where each bit position is an area of the medium radiation modifiable to different states of optical sensitivity representative of corresponding coded information states;

an array of spaced and selectively operable radiation sources, each source corresponding to one of the storage locations and adapted to radiate at least one of the bit positions thereof;

a source of input address signals for selectively energizing the radiation sources and corresponding storage locations;

means for effecting relative movement between the recording medium and the array such that the energized radiation sources sweepingly radiate all bit positions of the corresponding selected storage locations; and fine radiation source positioning means comprising a synchronizing mask having synchronizing information thereon, means for directing radiation from the sources to said mask, radiation sensing means disposed in transducing relation to said mask and said sources for producing signals indicative of required adjustment of the radiation sources of the array, and means responsive to the radiation sensing means signals for positioning the radiation sources correspondingly.

References Cited by the Examiner

UNITED STATES PATENTS

| | | | |
|---|---|---|---|
| 2,801,343 | 7/1957 | Johnson | 235—61.115 |
| 2,855,539 | 10/1958 | Hoover | 315—8.5 |
| 2,855,540 | 10/1958 | Hoover et al. | 315—8.5 |
| 2,933,246 | 4/1960 | Rabinow | 235—61.115 |
| 3,058,093 | 10/1962 | Vernon et al. | 235—61.115 |

MAYNARD R. WILBUR, *Primary Examiner.*

MALCOLM A. MORRISON, *Examiner.*

M. A. LERNER, D. W. COOK, *Assistant Examiners.*